US012782757B2

(12) United States Patent
Huang

(10) Patent No.: US 12,782,757 B2
(45) Date of Patent: Nov. 3, 2026

(54) EYE PROTECTION LENS, METHOD FOR MANUFACTURING THE SAME, AND GLASSES

(71) Applicant: SHENZHEN CHUYING SHIJIE HEALTH TECHNOLOGY CO., LTD., Shenzhen (CN)

(72) Inventor: Xiaoqiu Huang, Shenzhen (CN)

(73) Assignee: SHENZHEN CHUYING SHIJIE HEALTH TECHNOLOGY CO., LTD., Shenzhen (CN)

( * ) Notice: Subject to any disclaimer, the term of this patent is extended or adjusted under 35 U.S.C. 154(b) by 578 days.

(21) Appl. No.: 18/271,479

(22) PCT Filed: Apr. 12, 2023

(86) PCT No.: PCT/CN2023/087732
§ 371 (c)(1),
(2) Date: Jul. 10, 2023

(87) PCT Pub. No.: WO2024/156150
PCT Pub. Date: Aug. 2, 2024

(65) Prior Publication Data

US 2024/0393621 A1 Nov. 28, 2024

(30) Foreign Application Priority Data

Jan. 28, 2023 (CN) ......................... 202310042979.8

(51) Int. Cl.
*G02C 7/10* (2006.01)
*B05D 1/18* (2006.01)
*B05D 3/02* (2006.01)

(52) U.S. Cl.
CPC ............... *G02C 7/104* (2013.01); *B05D 1/18* (2013.01); *B05D 3/0272* (2013.01); *G02C 2202/16* (2013.01)

(58) Field of Classification Search
CPC ...... G02C 7/104; G02C 2202/16; B05D 1/18; B05D 3/0272
See application file for complete search history.

(56) References Cited

U.S. PATENT DOCUMENTS

2015/0362757 A1* 12/2015 Fu .......................... G02C 7/104 351/159.73

FOREIGN PATENT DOCUMENTS

CN 114859571 A * 8/2022 ............. G02C 7/104

OTHER PUBLICATIONS

Reiney et al. “Study of Degradation of Polystyrene, Using Ultraviolet Spectrophotometry” Journal of Research of the National Bureau of Standards vol. 51, No. Sep. 3, 1953 (Year: 1953).*

* cited by examiner

*Primary Examiner* — Robert S Walters, Jr.

(57) ABSTRACT

The present disclosure provides a method for manufacturing an eye protection lens, which includes: 100) performing an anti-blue light treatment and an anti-ultraviolet treatment on a lens by soaking: soaking the lens in a mixed solution containing a blue light absorber and an ultraviolet light absorber to complete the anti-blue light treatment and the anti-ultraviolet treatment of the lens, wherein, the ultraviolet light absorber comprises methacrylate and styrene with a mass ratio of 13:37; 200) performing an optical coating treatment on the lens: designing six optical layers with different thicknesses on a concave surface and a convex surface of the lens respectively, a transmittance of the lens after coating is no less than 96%, and a light transmission wavelength of the lens after coating has a range of 630-750 nm.

10 Claims, No Drawings

EYE PROTECTION LENS, METHOD FOR MANUFACTURING THE SAME, AND GLASSES

FIELD

The present disclosure relates to the technical field of eye protection lenses, specifically to an eye protection lens, a method for manufacturing the eye protection lens, and glasses.

BACKGROUND

Glasses, composed of lenses and frame, are used to improve eyesight, protect one's eyes, or used for decoration.

Lens is regarded as one of the important components of glasses. Currently, the existing lens technologies mainly include: 1. sunglasses that block the sunlight irradiation intensity, the sunglasses can prevent the damage of ultraviolet ray to eyes thereby protecting eyes; 2. anti-blue light glasses that prevent blue light from damaging eyes, the anti-blue light glasses can prevent the damage of blue light to eyes thereby protecting eyes.

However, with the increase of wearing time, the degree of myopia becomes higher and higher, and the above-mentioned prior arts all fail to really solve visual health problem.

SUMMARY

The present disclosure aims to provide an eye protection lens, a method for manufacturing the eye protection lens, and glasses, to solve the above problems in the prior art.

In order to achieve the above object, the present disclosure adopts the following technical solutions:

On the one hand, the present disclosure provides a method for manufacturing an eye protection lens which includes:

100) performing an anti-blue light treatment and an anti-ultraviolet treatment on a lens by soaking:

soaking the lens in a mixed solution containing a blue light absorber and an ultraviolet light absorber to complete the anti-blue light treatment and the anti-ultraviolet treatment of the lens, wherein, the ultraviolet light absorber includes methacrylate and styrene with a mass ratio of 13:37;

200) performing an optical coating treatment on the lens:

designing six optical layers with different thicknesses on a concave surface and a convex surface of the lens respectively to complete the optical coating treatment of the lens, so that a transmittance of the lens after coating is no less than 96%, and a light transmission wavelength of the lens after coating has a range of 630-750 nm.

As a kind of preferred technical solution in the present disclosure, a mass ratio of the blue light absorber and the ultraviolet absorber in the mixed solution is 1:1, when the lens is soaked in the mixed solution, a temperature of the mixed solution is 30-50 degrees, and a soaking time is 30-45 minutes.

As a kind of preferred technical solution in the present disclosure, the operation "performing an optical coating treatment on the lens" includes:

ultrasonic cleaning the lens, putting the lens in an oven and drying for 3.5-4.5 hours to dry the lens, the lens after drying is a lens to be coated;

putting the lens to be coated into a coating fixture, and then sending the lens and the coating fixture into a coating furnace, vacuuming a coating environment to $2.0*10^{-5}$ TOOR, ion cleaning the lens to be coated for 3-5 minutes, and then starting coating six optical layers with different thicknesses on the concave surface and the convex surface of the lens respectively, so that the transmittance of the lens after coating is no less than 96%, and the light transmission wavelength of the lens after coating has a range of 630-750 nm.

As a kind of preferred technical solution in the present disclosure, before performing the optical coating treatment on the lens, the method further includes an operation of hardening the lens, the operation of hardening the lens includes:

soaking the lens in a solvent containing hardening liquid, and then drying the lens in an oven at 90-110 degrees for 4-5 hours, a thickness of a hardening layer on each of the concave surface and convex surface of the lens is 3-5 μm.

As a kind of preferred technical solution in the present disclosure, designing the six optical layers with different thicknesses on the concave surface and the convex surface of the lens respectively, and a total thickness of the six optical layers is 161 nm-205 nm.

As a kind of preferred technical solution in the present disclosure, the six optical layers includes:

a first optical layer, having a thickness of 20 nm-30 nm and made of silicon monoxide;

a second optical layer, having a thickness of 8 nm-10 nm and made of trititanium pentoxide;

a third optical layer, having a thickness of 8 nm-10 nm and made of silicon dioxide;

a fourth optical layer, having a thickness of 50 nm-65 nm and made of trititanium pentoxide;

a fifth optical layer, having a thickness of 60 nm-70 nm and made of silicon dioxide; and a sixth optical layer, having a thickness of 15 nm-20 nm and made of AF layer.

On the other hand, the present disclosure also provides an eye protection lens which is manufactured by any one of the methods as described above.

On the other hand, the present disclosure further provides glasses, which includes a frame and the lenses manufactured by any one of the methods as described above, the lenses are mounted on the frame.

Beneficial effect: the eye protection lens manufactured by the method of the present disclosure and the glasses having the eye protection lens have very good anti-blue light and anti-ultraviolet effects, which can effectively prevent the eyes from being damaged by light and reduce the stimulation of the light reflected by the surface of the lens to the eyes, and effectively relieve visual fatigue of the eyes; the transmittance of the lens is also improved, and the transmittance of the prepared eye protection lens can be no less than 96%, so that the eyes can see things more clearly and easier, and the eye protection lens is more eye protective; the light transmission wavelength of the lens of the present disclosure has a range of 630-750 nm, retinal cells of the eyes are stimulated by low-energy red light with a wavelength of 630-750 nm. The retinal cells are activated and produce photobiological reactions to strengthen the retinal sclera, expand the choroidal blood vessels, and thicken the blood vessel walls, thereby shortening the eye axis, improving uncorrected vision, and accelerating blood circulation. Therefore, the vision is healthier.

DETAILED DESCRIPTION

In order to more clearly illustrate the technical solutions in the embodiments of the present disclosure or the prior art, the present disclosure will be briefly introduced below in conjunction with accompanying drawing and descriptions of embodiments or prior arts. Obviously, the following descriptions about the structure of the accompanying drawings are only some embodiments of the present disclosure, for those ordinary skilled in the art, under the premise of not paying creative work, other accompanying drawings can also be obtained according to these drawings. It should be noted here that the descriptions of these embodiments are used to help understand the present disclosure, but are not intended to limit the present disclosure.

Embodiment

The present embodiment provides a method for manufacturing an eye protection lens which includes:

100) performing an anti-blue light treatment and an anti-ultraviolet treatment on a lens by soaking:

soaking the lens in a mixed solution containing a blue light absorber and an ultraviolet light absorber to complete the anti-blue light treatment and the anti-ultraviolet treatment of the lens, wherein, the ultraviolet light absorber includes methacrylate and styrene with a mass ratio of 13:37; a mass ratio of the blue light absorber and the ultraviolet absorber in the mixed solution is 1:1, when the lens is soaked in the mixed solution, a temperature of the mixed solution is 30-50 degrees, and a soaking time is 30-45 minutes. The lens after being soaked in the mixed solution has good functions of absorbing ultraviolet light (300-400 nm) and blue light (380 nm-440 nm).

150) before performing the optical coating treatment on the lens, the method further includes an operation of hardening the lens, the operation of hardening the lens includes:

Lens (lens with a refractive index of 1.5 and lens with a refractive index of 1.69 are commonly used) is soaked in a solvent containing hardened liquid, and then the lens is put in an oven with a temperature of 90-110 degrees (such as 90 degrees, 100 degrees, or 110 degrees, the temperature can be adjusted according to the actual situation in this range) for 4-5 hours (such as 4 hours, 4.5 hours or 5 hours, the baking time can be adjusted according to the actual situation within this range), under this temperature and the baking time, the hardening effect of the lens is the best. If these conditions are not met, the surface hardness of the lens will not meet the requirements. If these conditions are exceeded, the surface hardness of the lens will be too hard and too brittle, and the hardening layer on the lens surface may crack easily. The thickness of the hardening layer on each of the concave and convex surfaces of the lens is 3-5 μm (such as 3 μm, 4 μm or 5 μm, the thickness can be adjusted according to the actual situation within this range).

200) performing an optical coating treatment on the lens:

Before vapor deposition, the lens is cleaned with ultrasonic waves, then the lens is put into the oven and dried for 3.5-4.5 hours (such as 3.5 hours, 4 hours or 4.5 hours, the drying time can be adjusted according to actual conditions within this range). The lens is dried, and the lens after drying is the lens to be coated. The moisture in the lens can be fully dried after the lens is baked under this condition. When the lens is coated, the coating layer can be combined with the lens most stably, if the baking time is insufficient or too long, it will affect the stability of the combination of the coating layer and the lens.

Before coating, the lens to be coated is put into a coating fixture, and then the lens and the coating fixture are put into a coating furnace, a coating environment is vacuumed to $2.0*10^{-5}$ TOOR, the lens to be coated is ion cleaned to enhance the adhesion of the coating layer, and then six optical layers with different thicknesses are coated on the concave surface and the convex surface of the lens respectively. The optical layers make the lens to have a light transmission wavelength of 630-750 nm, the reflection of the lens surface after coating is reduced by 70-80%, and the transmittance of the single side of the lens is increased by 2-3%. When the optical layers are designed as six layers, the reflectivity of the lens after the coating can be reduced and the transmittance reaches the best effect, and too few or too more optical layers will affect reflectivity and transmittance effect of the lens.

In detail, the six optical layers with different thicknesses are designed on the concave surface and the convex surface of the lens respectively, a total thickness of the six optical layers is 161 nm-205 nm, and the six optical layers includes:

a first optical layer, having a thickness of 20 nm-30 nm and made of silicon monoxide;

a second optical layer, having a thickness of 8 nm-10 nm and made of trititanium pentoxide;

a third optical layer, having a thickness of 8 nm-10 nm and made of silicon dioxide;

a fourth optical layer, having a thickness of 50 nm-65 nm and made of trititanium pentoxide;

a fifth optical layer, having a thickness of 60 nm-70 nm and made of silicon dioxide; and a sixth optical layer, having a thickness of 15 nm-20 nm and made of AF (anti-fingerprint, which is the abbreviation of anti-fingerprint vacuum coating) layer. The AF layer can improve the anti-fouling performance of the sixth optical layer.

The present embodiment provides an eye protection lens which is manufactured by the method as described in the above-mentioned embodiments.

The present embodiment provides glasses which include a frame and the eye protection lenses manufactured by the method as described in the above-mentioned embodiments, the eye protection lenses are mounted on the frame.

The eye protection lens manufactured by the method of the present disclosure and the glasses having the eye protection lens have very good anti-blue light and anti-ultraviolet effects, which can effectively prevent the eyes from being damaged by light and reduce the stimulation of the light reflected by the surface of the lens to the eyes, and effectively relieve visual fatigue of the eyes; the transmittance of the lens is also improved, and the transmittance of the prepared eye protection lens can be no less than 96%, so that the eyes can see things more clearly and easier, and the eye protection lens is more eye protective; the light transmission wavelength of the lens of the present disclosure has a range of 630-750 nm, retinal cells of the eyes are stimulated by low-energy red light with a wavelength of 630-750 nm. The retinal cells are activated and produce photobiological reactions to strengthen the retinal sclera, expand the choroidal blood vessels, and thicken the blood vessel walls, thereby shortening the eye axis, improving uncorrected vision, and accelerating blood circulation. Therefore, the vision is healthier.

Finally, it should be noted that: the above is only a preferred embodiment of the present disclosure, and is not intended to limit the protection scope of the present disclosure. Any modifications, equivalent replacements, improvements, etc., made within the spirit and principles of the present disclosure shall be included within the protection scope of the present disclosure.

What is claimed is:

1. A method for manufacturing an eye protection lens, comprising:

100) performing an anti-blue light treatment and an anti-ultraviolet treatment on a lens by soaking:

soaking the lens in a mixed solution containing a blue light absorber and an ultraviolet light absorber to complete the anti-blue light treatment and the anti-ultraviolet treatment of the lens;

200) performing an optical coating treatment on the lens:

designing six optical layers with different thicknesses on a concave surface and a convex surface of the lens respectively to complete the optical coating treatment of the lens, so that a transmittance of the lens after coating is no less than 96%, and a light transmission wavelength of the lens after coating has a range of 630-750 nm;

wherein the six optical layers comprise:

a first optical layer, having a thickness of 20 nm-30 nm and made of silicon monoxide;

a second optical layer, having a thickness of 8 nm-10 nm and made of trititanium pentoxide;

a third optical layer, having a thickness of 8 nm-10 nm and made of silicon dioxide;

a fourth optical layer, having a thickness of 50 nm-65 nm and made of trititanium pentoxide;

a fifth optical layer, having a thickness of 60 nm-70 nm and made of silicon dioxide; and a sixth optical layer, having a thickness of 15 nm-20 nm and made of AF (anti-fingerprint) layer.

2. The method for manufacturing an eye protection lens according to claim 1, wherein a mass ratio of the blue light absorber and the ultraviolet absorber in the mixed solution is 1:1, when the lens is soaked in the mixed solution, a temperature of the mixed solution is 30-50° C., and a soaking time is 30-45 minutes.

3. The method for manufacturing an eye protection lens according to claim 1, wherein the operation "performing an optical coating treatment on the lens" comprises:

ultrasonic cleaning the lens, putting the lens in an oven and drying for 3.5-4.5 hours to dry the lens, the lens after drying is a lens to be coated;

putting the lens to be coated into a coating fixture, and then sending the lens and the coating fixture into a coating furnace, vacuuming a coating environment to 2.0*10-5 Torr, ion cleaning the lens to be coated for 3-5 minutes, and then starting coating six optical layers with different thicknesses on the concave surface and the convex surface of the lens respectively, so that the transmittance of the lens after coating is no less than 96%, and the light transmission wavelength of the lens after coating has a range of 630-750 nm.

4. The method for manufacturing an eye protection lens according to claim 3, wherein before performing the optical coating treatment on the lens, the method further comprises an operation of hardening the lens, the operation of hardening the lens comprises:

soaking the lens in a solvent containing hardening liquid, and then drying the lens in an oven at 90-110° C. for 4-5 hours, a thickness of a hardening layer on each of the concave surface and the convex surface of the lens is 3-5 μm.

5. An eye protection lens, wherein the eye protection lens is manufactured by the method according to claim 1.

6. The eye protection lens according to claim 5, wherein a mass ratio of the blue light absorber and the ultraviolet absorber in the mixed solution is 1:1.

7. The eye protection lens according to claim 5, wherein a thickness of a hardening layer on each of the concave surface and the convex surface of the lens is 3-5 μm.

8. Glasses, comprising a frame and the lenses manufactured by the method according to claim 1, wherein the lenses are mounted on the frame.

9. The glasses according to claim 8, wherein a mass ratio of the blue light absorber and the ultraviolet absorber in the mixed solution is 1:1.

10. The glasses according to claim 8, wherein a thickness of a hardening layer on each of the concave surface and the convex surface of the lens is 3-5 μm.

* * * * *